United States Patent Office 3,326,989
Patented June 20, 1967

3,326,989
STABILIZED METHYL CHLOROFORM COMPOSITIONS WITH IMPROVED EVAPORATION CHARACTERISTICS
Charles L. Cormany, Wadsworth, and Donald A. Reich, Barberton, Ohio, assignors to Pittsburgh Plate Glass Company, Pittsburgh, Pa., a corporation of Pennsylvania
No Drawing. Filed Aug. 18, 1964, Ser. No. 390,473
4 Claims. (Cl. 260—652.5)

This invention relates to methylchloroform. It more particularly concerns methylchloroform compositions of enhanced utility.

Methylchloroform, 1,1,1-trichloroethane, is a normally liquid chlorinated hydrocarbon of considerable value as an industrial solvent. Despite highly advantageous solvent properties, methylchloroform's tendency to decompose, especially under many conditions, is a deterrent to its commercial use.

Addition to methylchloroform of one or more of a large number of compounds is described in the literature as means for overcoming or minimizing this tendency to decompose. Among the compounds which when added either alone or in combination with other additives to methylchloroform improve the stability characteristics are alcohols. U.S. 2,811,252 describes methylchloroform compositions which include minor amounts of non-primary alkanols containing from 4 to 8 carbon atoms per molecule. Methylchloroform compositions containing aliphatic monohydric acetylenic alcohols of less than 8 carbon atoms are described in U.S. 2,838,458. U.S. 3,000,978 shows tertiary butyl alcohol improves the stability of methyl-chloroform. In U.S. 3,070,634, methylchloroform compositions containing both acetylenically unsaturated monohydric alcohols and saturated alcohols are shown to possess improved stability. According to this patent, mostly these acetylenically unsaturated monohydric alcohols are 3 to 12 carbon acetylenic alcohols and the saturated alcohols are notably lower molecular weight saturated alkanols of 1 to 8 carbons.

Despite the advantageous results which accrue through the use of monohydric alcohols, the presence in methylchloroform compositions of alcohols also alters other properties. The nature of the evaporation from a non-porous surface of a methylchloroform composition in which even a minor amount (e.g., 0.25 percent by weight) of monohydric alcohol has been incorporated differs from when no such alcohol is present. Thus, when methylchloroform compositions containing a monohydric alcohol are evaporated from a surface, usually a metal surface, they leave spots on the surface. It is desirable to avoid such spots or "spotting" (as the effect is frequently referred to).

Now it has been discovered that deficiencies in the evaporation characteristics of alcohol containing methylchloroform compositions may be overcome by the use of even small amounts of a tetrahydro-2-alkylfuran such as tetrahydro-2-methylfuran in the composition. Thus, pursuant to the present invention, a tetrahydro-2-alkylfuran is included in an alcohol containing methylchloroform composition to provide compositions of methyl-chloroform evidencing improved and desirable evaporation characteristics and which do not exhibit significant spotting.

A tetrahydrofuran concentration in the range of from about 0.05 to about 5 weight percent basis the methylchloroform content of the methylchloroform composition has a desirable impact. Usually, the tetrahydroalkylfuran is used in the range of about 0.25 to about 3.0 weight percent basis the methylchloroform content of the composition. Although higher concentrations (e.g., up to 10 weight percent) are operative, they rarely can be economically justified.

Use of tetrahydro-2-methylfuran or the like pursuant to this invention is appropriate to any alcohol treated methylchloroform composition, e.g., any methylchloroform which includes alcohol to improve the stability, reduce the corrosiveness, etc., of the methylchloroform.

Tetrahydro-2-alkylfurans may be represented by the formula:

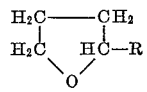

wherein R is an alkyl group, notably a lower alkyl group of up to 3 carbon atoms such as methyl, ethyl, n-propyl or isopropyl. Of these useful furans, tetrahydro-2-methylfuran is especially recommended.

This invention is applicable to the compositions provided by incorporating in methylchloroform any of the large number of monohydric aliphatic alcohols, both saturated and unsaturated, such as those which are suggested by the patent literature described hereinbefore. Most of these alcohols contain no more than 8 carbon atoms and usually at least 4 carbon atoms. Alcohols such as tertiary butyl alcohol, secondary butyl alcohol, isobutyl alcohol, tertiary amyl alcohol, 2-octanol, and the like are representative of the saturated monohydric alkanols mentioned in the patent literature as being of especial value. Lower aliphatic monohydric unsaturated alcohols, notably acetylenically unsaturated alcohols containing 8 carbon atoms or less are also included in methylchloroform for stabilization purposes. Among these, 2-methyl-3-butyne-2-ol, 3-methyl-1-pentyne-3-ol, 2-butyne-1-ol, 2-methyl-3-hexyn-2-ol and propargyl alcohol may be mentioned by way of illustration.

In general, the alcohol content of the methyl-chloroform is likely to vary considerably, depending upon the stabilizing function the alcohol or mixture of alcohols is to perform and whether other stabilizing additives are present. Rarely, however, is the alcohol content of the methylchloroform less than about 0.05 weight percent. More normally, the monohydric alcohol content of the methylchloroform composition will range from about 0.5 to about 5.0 percent (most frequently 1.0 to 2.0 percent) by weight of the methylchloroform. Higher concentrations, e.g., above 5 percent by weight of the methylchloroform, are rarely employed although operable.

In the methylchloroform compositions herein contemplated, the tetrahydro-2-alkylfuran content usually is one-half to five times the weight of the alcohol. Thus, an illustrative methylchloroform composition herein contemplated is provided by adding to the methylchloroform from 0.5 to 2.0 parts of tetrahydro-2-methylfuran per part by weight of alcohol or mixture of alcohols also added to the methylchloroform. For example, if alcohol in an amount of 1 percent by weight has been added to the methylchloroform, the amount of added toluene will typically be between 0.5 to 5.0 weight percent of the methylchloroform.

The following example illustrates the performance of methylchloroform compositions which illustrate the present invention:

Example I

A composition of methylchloroform was prepared which contained the following:

| Additive: | Percent by wt. methylchloroform |
|---|---|
| t-Butyl alcohol | 2.0 |
| Nitromethane | 2.0 |
| t-Amyl alcohol | 1.0 |
| Butylene oxide | 0.5 |
| Dimethoxyethane | 0.2 |

This composition (and one which had included therein tetrahydro-2-methylfuran) was tested to evaluate its rate of evaporation by a procedure in which 2 milliliters of the solvent composition was pipetted onto a clean horizontal aluminum plate at room temperature and the period of time it took until the solvent had evaporated (until the plate appears dry) was measured.

Table I lists the compositions tested and the results:

TABLE I

| Additive | Percent by Volume Methylchloroform | Evaporation Time, Minutes and Seconds |
|---|---|---|
| None | | 14:00; 14:00 |
| Tetrahydro-2-methylfuran | 5.0 | 7:14; 8:03 |

The methylchloroform compositions in Table I were tested to ascertain what if any residue remains after permitting them to evaporate from a sheet of polished metal. The procedure involves slowly pouring the solvent composition along the length of a polished 8 by 36 inch panel of 7075 alloy aluminum supported at an angle of about 45 degrees and allowing it to evaporate from the surface while at room temperature.

The composition without tetrahydro-2-methylfuran broke into many droplets on the plate and left noticeable residues (spots or stains) on the plate after evaporation. The tetrahydro-2-methylfuran containing composition, in contradistinction, did not break into droplets and leave such residues.

Use of tetrahydro-2-alkylfurans in accordance with this invention provides the hereinbefore demonstrated advantageous results with methylchloroform compositions containing not only alcohols but other components including additives which are present for the purpose of stabilizing the composition and/or reducing its corrosiveness. As the tetrahydro-2-methylfuran containing composition of Example I demonstrates, methylchloroform often has incorporated therein a plurality of additives besides alcohols for the purpose of imparting beneficial stability or anti-corrosion properties to the methylchloroform.

Thus, nitroaliphatic compounds, notably 1 to 3 carbon nitroalkanes such as nitromethane, nitroethane, alpha-nitropropane, beta-nitropropane and 2-chloro-nitroethane, may be present. Also, the presence of 2 to 10 carbon epoxides other than butylene oxide, including ethylene oxide, propylene oxide, 2-methyl-1,2-epoxypropane, epichlorohydrin, styrene oxide, glycidol, amylene oxide, 1,2-epoxyoctane, epoxycyclopentene, cyclohexene oxide; diepoxides illustrated by butadiene dioxide and cyclopentadiene diepoxide.

Dioxolane (1,3-dioxolane) or substituted 1,3-dioxolanes including 2-methyl-1,3-dioxolane, 2-ethyl-1,3-dioxolane, 2-isopropyl dioxolane, 2,2-dimethyl-1,3-dioxolane, 2-methyl-4-methyl-1,3-dioxolane, 5,5-dimethyl-1,3-dioxolane, 2-choloro-4-methyl-1,3-dioxolane may be present. Dioxane, tetrahydrofuran, furan, pyran and other cyclics are of use. Ketones, nitriles, dialkoxy alkanes are among the classes of other additives which may be incorporated.

While this invention has been illustrated and is principally applicable to solvent compositions in which methylchloroform is the principal or main solvent (or as the art sometimes specifies, the "base" solvent), the invention is applicable to solvent compositions in which methylchloroform is but one of several solvents. Thus, the invention is pertinent to solvent compositions of methylchloroform in combination with one or more other solvents, especially halogenated (primarily chlorinated or chlorofluoro) hydrocarbon solvents such as methylene chloride, carbon tetrachloride, chloroform, 1,2-dichloroethane, trichloroethylene and perchloroethylene. Specific solvent mixtures of this type include 70–85 percent methylchloroform and 30–15 percent per chloroethylene by weight; 60–95 percent methylchloroform and 40–5 percent, 1,2-dichloroethane by weight; and 65–95 percent methylchloroform and 35–5 percent trichloroethylene. Other organic solvents which can be combined with methylchloroform include the common hydrocarbon solvents, e.g., Stoddard's solvents, hexane, etc.

While the present invention has been described by reference to specific details of certain embodiments, it is not intended that it be construed as limited to such details except insofar as they appear in the appended claims.

What is claimed is:

1. Methylchloroform containing at least about 0.05 weight percent of an aliphatic monohydric alcohol selected from the group consisting of alkanols having up to 8 carbon atoms and alkinols having 3 to 12 carbon atoms, and at least about 0.05 weight percent of a tetrahydro-2-alkylfuran, said alkyl group containing from 1 to 3 carbon atoms.

2. A methylchloroform composition containing a minor concentration of an aliphatic monohydric alcohol selected from the group consisting of alkanols having up to 8 carbon atoms and alkinols having 3 to 12 carbon atoms having its evaporation characteristic improved by the presence therein of from 0.05 to 5.0 percent by weight of a tetrahydro-2-lower alkylfuran, said alkyl group containing from 1 to 3 carbon atoms.

3. A methylchloroform composition containing a minor concentration of an aliphatic monohydric alcohol selected from the group consisting of alkanols having up to 8 carbon atoms and alkinols having 3 to 12 carbon atoms having its evaporation characteristic improved by the presence therein of from 0.05 to 5.0 percent by weight of tetrahydro-2-methylfuran.

4. Methylchloroform stabilized with from 0.05 to 5.0 weight percent of alphatic monohydric alkanol having up to 8 carbon atoms and containing from 0.5 to 5.0 weight percent of tetrahydro-2-methylfuran.

References Cited

UNITED STATES PATENTS 2,870,094 1/1959 Cathcart _____ 260—652.5 XR
3,070,634 12/1962 Hardies et al. _____ 260—652.5

LEON ZITVER, *Primary Examiner.*

BERNARD HELFIN, *Examiner.*

MATTHEW M. JACOB, *Assistant Examiner.*